(12) United States Patent
Booth et al.

(10) Patent No.: US 8,156,382 B1
(45) Date of Patent: Apr. 10, 2012

(54) SYSTEM AND METHOD FOR COUNTING STORAGE DEVICE-RELATED ERRORS UTILIZING A SLIDING WINDOW

(75) Inventors: Wayne Booth, Mountain View, CA (US); Melvin McGee, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 282 days.

(21) Appl. No.: 12/111,842

(22) Filed: Apr. 29, 2008

(51) Int. Cl.
*G06F 11/00* (2006.01)
(52) U.S. Cl. ........................ 714/47.2; 714/42; 714/47.1
(58) Field of Classification Search ..................... 714/42, 714/47, 47.1, 47.2
See application file for complete search history.

(56) References Cited

U.S. PATENT DOCUMENTS

| | | | |
|---|---|---|---|
| 7,131,032 B2* | 10/2006 | Gibson et al. | 714/26 |
| 7,523,359 B2* | 4/2009 | Richards et al. | 714/49 |
| 7,911,950 B2* | 3/2011 | Edsall et al. | 370/232 |
| 2003/0135794 A1* | 7/2003 | Longwell et al. | 714/42 |

* cited by examiner

*Primary Examiner* — Philip Guyton
(74) *Attorney, Agent, or Firm* — Zilka-Kotab, PC

(57) ABSTRACT

A system and method are provided for counting storage-related error events using a sliding window. This is accomplished by counting error events that occur within a sliding window of time and triggering a reaction based on such count. By this feature, the error events are counted with additional accuracy so that a reaction will be appropriately triggered. To this end, in various embodiments, more accurate error counting is afforded to avoid a situation, such as in fixed sampling window frameworks, where an appropriate reaction is not triggered due to a failure to count an appropriate number error events in close proximity.

23 Claims, 9 Drawing Sheets

SYSTEM AND METHOD FOR COUNTING STORAGE DEVICE-RELATED ERRORS UTILIZING A SLIDING WINDOW

FIELD OF THE INVENTION

The present invention relates to storage systems, and more particularly to counting error events in storage systems.

BACKGROUND

A storage server is a special purpose processing system used to store and retrieve data on behalf of one or more clients. A storage server typically operates on behalf of one or more clients to store and manage shared files in a set of mass storage devices, such as magnetic or optical storage-based disks or tapes. In use, the foregoing mass storage devices are monitored for error events, in order to manage a health of the system, etc. Typically, these error events are counted over a predetermined time such that, if they surpass a predetermined error rate threshold, appropriate action may be taken. For example, a mass storage device or associated link that exhibits a predetermined number of error events within a predetermined time period may be disabled, disconnected, or otherwise taken out of service, etc.

FIG. 1 illustrates an exemplary error counting technique 100 using fixed sampling windows 102, in accordance with the prior art. As shown, a plurality of error events 104 are counted in each of the fixed sampling windows 102. Various issues associated with such error counting technique 100 arise in view of the fixed nature of the sampling windows 102. For example, in the case where an error threshold number of 4 events is defined for each sampling window 102, the current technique 100 would only count 2 error events in a first one of the sampling windows 102, and only count 2 error events in a second one of the sampling windows 102, as shown. By this design, the threshold will not trigger a reaction in a situation where a threshold number of events has occurred in close proximity.

There is thus a need for addressing such problems associated with the prior art.

SUMMARY

A system and method are provided for counting storage-related error events using a sliding window. This is accomplished by counting error events that occur within a sliding window of tune and triggering a reaction based on such count. By this feature, the error events are counted with additional accuracy so that a reaction will be appropriately triggered. To this end, in various embodiments, more accurate error counting is afforded to avoid a situation, such as in fixed sampling window frameworks, where an appropriate reaction is not triggered due to a failure to count an appropriate number error events in close proximity.

Using the foregoing technique, disruptive storage devices may be more effectively taken out of service by more accurately counting error events that warrant such disablement. Still yet, this may be accomplished with less or even without intervention from host software or a system administrator, in some embodiments. By virtue of such reduced interaction, customer perception may also be improved, as a result of the perceived proactive maintenance and protection of user data.

In one example of use according to one embodiment, a sliding window and a threshold number of error events are defined for use while monitoring an operation of at least one storage device. During such monitoring, a plurality of error events are detected associated with the operation of the at least one storage device. Such events are, in turn, counted utilizing the sliding window. It may then be determined whether the threshold number of error events has been exceeded in the sliding the window. If so, an appropriate reaction may be initiated.

In different embodiments, such the threshold may take on various forms. For example, the threshold number of error events may be defined as a number of error events that disrupt and/or even preclude input/output operation of the at least one storage device. In additional embodiments, a plurality of different thresholds may be utilized to trigger the reaction. In still additional embodiments, a duration of the sliding window may be user-configurable. Thus, in some optional embodiments, the thresholds and sliding window duration may be set to a desired error rate at which to react to a misbehaving device, as will soon become apparent.

While the reaction may take any desired form, it may, in one possible embodiment involve reporting that the threshold has been met. In another embodiment, the reaction may include disabling a PHY device that communicates with the at least one storage device. Subsequently, the enabling PHY device may be enabled based on predetermined criteria (e.g. whether the PHY device is replaced, whether the PHY device is deactivated and subsequently activated, etc.).

DETAILED DESCRIPTION

In use, systems and methods according to various embodiments are provided for counting errors in a storage environment including transmitters, receivers, etc. that communicate data back and forth for storage purposes. Such errors may occur as result of a faulty transmitter, faulty receiver, firmware bug, broken cable and/or connector, etc. In the context of the present description, such errors may be referred to as "error events." The purpose of counting such error events is so that various actions (i.e. reactions) can be taken when a total sum of such error events reaches a certain number (e.g. a threshold).

In the past, such error events were counted using fixed sampling windows which were each defined by a fixed starting point in time and a fixed ending point in time. For example, in the case where an error threshold number of four events is defined for each fixed sampling window, a reaction would only occur when a number of error events tallied between the fixed starting point and the fixed ending point reaches four.

To address limitations with the use of such fixed sampling windows, a system and method are provided for counting storage-related error events using a sliding window. Unlike the aforementioned fixed sampling windows, the sliding window has starting and ending points that move with time. Thus, the error event counts may be accomplished by counting error events that occur within the sliding window of time. An example of such sliding window counting scheme will be set forth later in greater detail. In use, a reaction may be triggered based on such count. In various embodiments, a threshold may be defined so as to appropriately trigger such reaction.

In one example of use according to one embodiment, a sliding window and a threshold number of error events are defined for use while monitoring an operation of at least one storage device. During such monitoring, a plurality of error events are detected associated with the operation of the at least one storage device. Such events are, in turn, counted utilizing the sliding window. It may then be determined whether the threshold number of error events has been counted in the sliding the window. If so, an appropriate reaction may be initiated.

By this feature, error events may be counted with additional accuracy so that a reaction will be appropriately triggered. To this end, in various embodiments, more accurate error counting is afforded to avoid a situation, such as in fixed sampling window frameworks, where an appropriate reaction is not triggered due to a failure to count an appropriate number error events during a predetermined time window. More information will now be set forth regarding the underlying features with which the foregoing technique is made possible, according to various embodiments.

Figure 2:
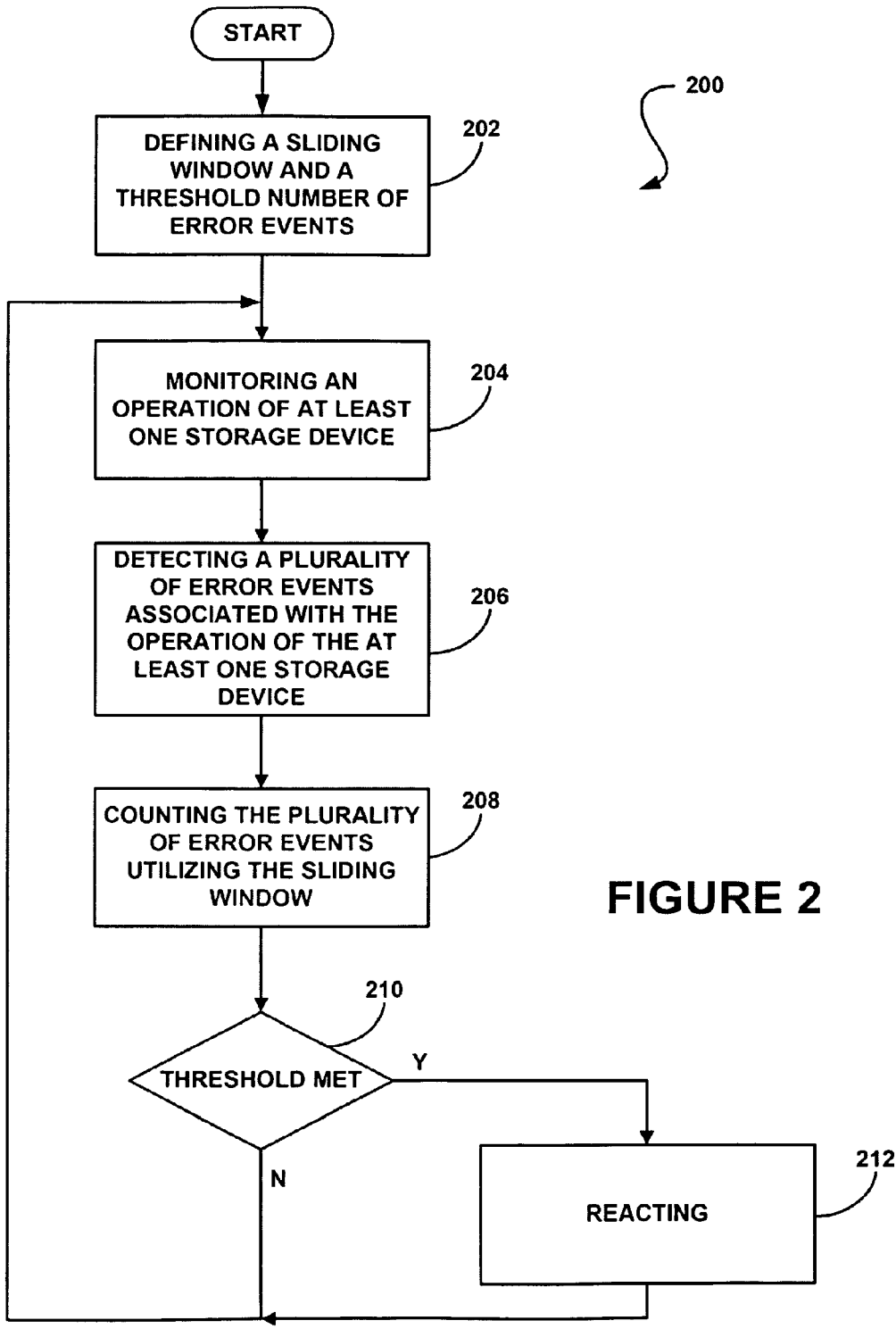
FIG. 2 illustrates a method for counting storage-related error events using a sliding window, in accordance with one embodiment.

FIG. 2 illustrates a method 200 for counting storage-related error events using a sliding window, in accordance with one embodiment. In the context of the present description, such storage-related error events may include any event that indicates an error in association with a storage device. In one embodiment, the storage-related error events may relate to a communication link between a storage device and an accessing device. In such embodiment, the storage-related error event may take the form of a link error event that may result from a faulty transmitter, faulty receiver, firmware bug, broken cable and/or connector, etc. Of course, such exemplary storage-related error events are set forth for illustrative purposes only, as any error event that meets the above definition is contemplated.

Also in the present description, the storage device may include any hardware capable of storing data. For example, the storage device may, in one embodiment, include one or more mechanical hard drives. In various embodiments, the storage device may take various forms including, but not limited to a serial advanced technology attachment (SATA) storage device, a serial attached small computer system interface (SAS) storage device, a solid state storage device (e.g. flash memory), an optical storage device, etc.

With reference now to FIG. 2, a sliding window and at least one threshold number of error events are defined. See operation 202. In the context of the present description, such sliding window may include any window of time with a starting point and an ending point that change over time. For example, if, from the start (i.e. t=0), the starting point is a first point in time (ST=x) and the ending point is a second point in time (ET=y), such starting and ending points in time that define the sliding window will increment with time. See Table 1, for example, which illustrates how the sliding window "slides" over time.

TABLE 1

| t = 0 | ST = x     | ET = y     |
|-------|------------|------------|
| t = 1 | ST = x + 1 | ET = y + 1 |
| t = 2 | ST = x + 2 | ET = y + 2 |
| t = 3 | ST = x + 3 | ET = y + 3 |
| t = 4 | ST = x + 4 | ET = y + 4 |
| t = 5 | ST = x + 5 | ET = y + 5 |

In various embodiments, such sliding window and threshold may be defined in any automatic and/or manual manner. In one possible embodiment, such sliding window and threshold may be manually configured remotely via a host coupled to a storage device over a network, etc. Still yet, the various sliding window and/or threshold values may be defined to be valid for a limited predetermined amount of time or be persistent between system boots. Still yet, the sliding window and threshold may, in another embodiment, include factory default settings.

In different embodiments, such the threshold may take on various forms. For example, the threshold number of error events may be defined as a number of error events that disrupt and/or event preclude input/output operation of the at least one storage device. In additional embodiments, a plurality of different thresholds may be utilized. In any case, the sliding window and the threshold number of error events may be stored in any desired memory. For instance, the sliding window and the threshold number of error events may be stored in expander memory as will be set forth in greater detail during references to the embodiments of FIGS. 3-4.

As indicated in operation 204, such sliding window and threshold are adapted for use while monitoring an operation of the storage device(s). Specifically, a plurality of the error events are detected in association with the operation of the at least one storage device. See operation 206. Such detection may, for example, include the receipt of a signal indicative of any of the error events mentioned hereinabove.

Further, such events are, in turn, counted utilizing the sliding window. Note operation 208. In one embodiment, such count of error event may be accomplished by running a tally of error events that occurred within the sliding window. Of course, such tally may increase and/or decrease, as the sliding window is slides over time. Table 2 illustrates an example of such counting technique. As noted in such table, the count tally may increase or decrease based on the number of events counted between the starting and ending points of the sliding window at a particular instant in time.

TABLE 2

| t = 0 | ST = x     | ET = y     | Count = 1 |
|-------|------------|------------|-----------|
| t = 1 | ST = x + 1 | ET = y + 1 | Count = 3 |
| t = 2 | ST = x + 2 | ET = y + 2 | Count = 2 |
| t = 3 | ST = x + 3 | ET = y + 3 | Count = 4 |
| t = 4 | ST = x + 4 | ET = y + 4 | Count = 5 |
| t = 5 | ST = x + 5 | ET = y + 5 | Count = 3 |

More information regarding another example of such sliding window-based counting technique will be described during reference to FIG. 6.

It may then be determined in decision 210 whether the threshold number of error events has been counted in the sliding the window. If so, an appropriate reaction may be initiated. See operation 212.

By using the sliding window in such fashion, error events may be counted with additional accuracy so that the reaction of operation 212 will be more appropriately triggered. While the reaction of operation 208 may take any desired form, it may, in one possible embodiment, involve reporting that the threshold has been met. In another embodiment, the reaction may include disabling a PHY device that communicates with the at least one storage device. Such disablement may take the form of disabling, disconnecting or otherwise taking the PHY device and/or the associated storage device/link out of service.

In the present description, such PHY device may include a transceiver that electrically interfaces with a physical link and/or storage device, as well as the portions of a protocol that encodes data and manages reset sequences, etc. Each PHY device that resides in a system component [e.g. storage device, expander, SAS host bus adapter (HBA), a driver, etc.] has a PHY identifier unique to such device.

Subsequently, the disabled PHY device may be enabled based on predetermined criteria. For example, in one embodiment, such criteria may hinge on whether the PHY device is replaced. In another embodiment, the criteria may depend on whether the PHY device is deactivated and subsequently activated, etc. Such "power-cycling" may correct any source of the error events by re-initializing the PHY device, etc., and thus allow for re-enablement of the PHY device. In any case, sensors may be used to detect whether such criteria is met, so that the enablement may be performed.

More illustrative information will now be set forth regarding various optional architectures and features of different embodiments with which the foregoing technique may or may not be implemented, per the desires of the user. It should be strongly noted that the following information is set forth for illustrative purposes and should not be construed as limiting in any manner. Any of the following features may be optionally incorporated with or without the other features described.

Figure 3:
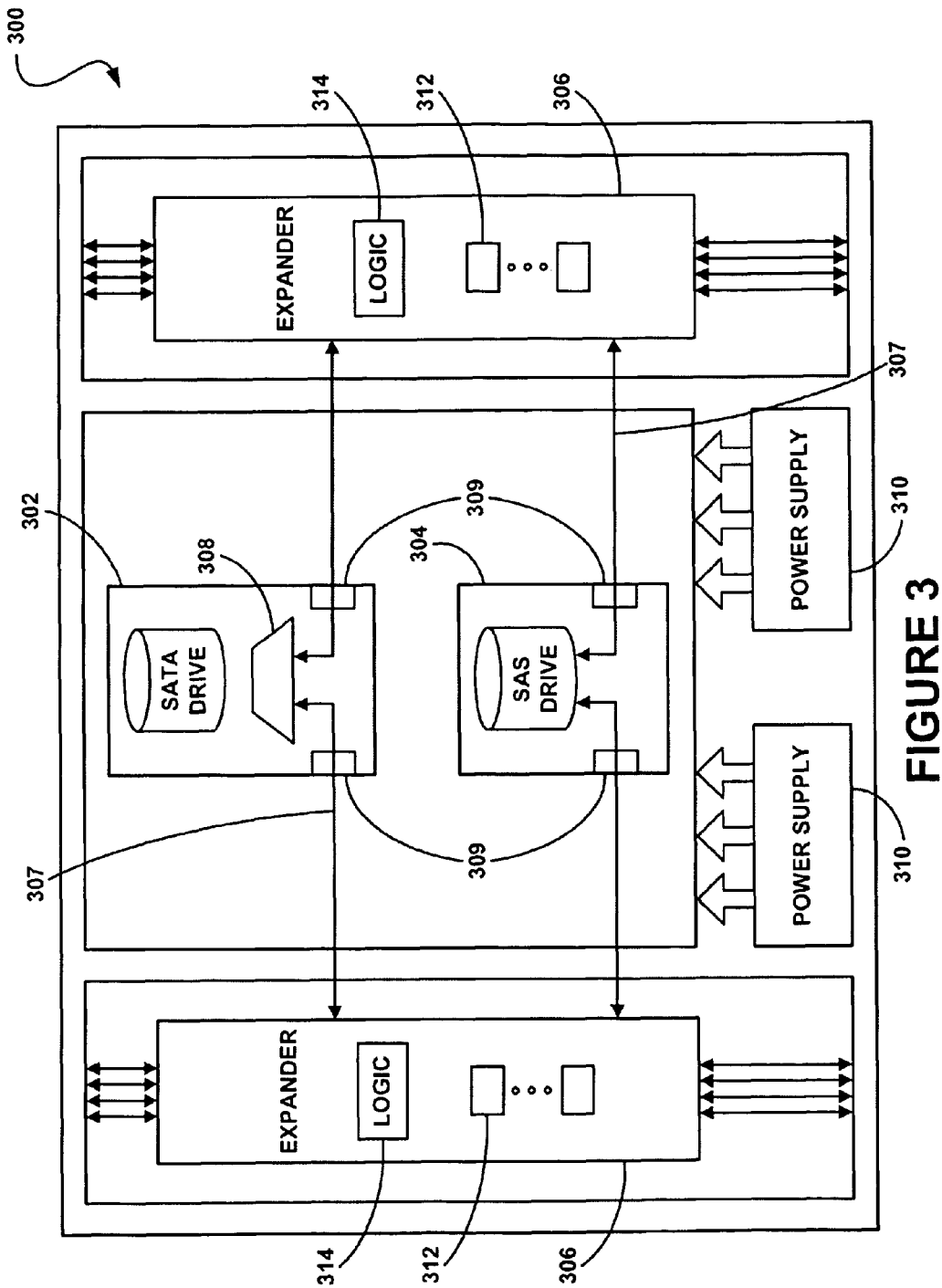
FIG. 3 illustrates a "just a bunch of disks" (JBOD) storage sub-system, in accordance another embodiment.

FIG. 3 illustrates a "just a bunch of disks" (JBOD) storage sub-system 300, in accordance another embodiment. As an option, the JBOD storage sub-system 300 may be implemented to carry out the functionality of FIG. 2. Of course, however, the JBOD storage sub-system 300 may be implemented in any desired environment. It should be noted that the definitions provided above equally apply to the present description.

In one embodiment, the JBOD storage sub-system 300 may represent one of multiple "shelves" which each include a plurality of storage devices. As shown, one or more SATA storage devices 302, and/or one or more SAS storage devices 304 may be provided. Such storage devices 302, 304 may, in turn, communicate with a pair of expanders 306 via a plurality of links 307. Such expanders 306 each include an interface that expands a number of devices that can access the storage devices 302, 304.

As shown, the storage devices 302, 304 may be equipped with PHY devices 309 for facilitating such communication. As set forth earlier, such PHY includes a transceiver that electrically interfaces with a physical link and/or storage device. As an option, the SATA storage devices 302 may also communicate with the expanders 306 via a multiplexer 308. For power purposes, a plurality of power supplies 310 may be coupled to the storage devices 302, 304, and the expanders 306.

While two expanders 306 and specific types of storage devices are shown in FIG. 3, it should be noted that other embodiments are contemplated involving a single expander 306 and other types of storage devices. While not shown, the expanders 306 of the JBOD storage sub-system 300 may be daisy-chained or otherwise connected to other sub-systems (not shown) to form an overall storage system. Additional details regarding one possible storage system will be set forth during the description of different embodiments illustrated in subsequent figures.

In use, the expanders 306 may be equipped with one or more hardware counters 312 for counting error events propagated by the storage devices 302, 304 via the links 207. Such hardware counters 312 may include memory that is a component of the associated expander 306. Of course, the hardware counters 312 may reside elsewhere, as desired.

To more accurately count such error events, the one or more counters 312 of the expanders 306 may be equipped with logic 314 for counting such error events using a sliding window. In one embodiment, such sliding window-counting may be performed in firmware. Of course, however, such logic may be implemented in hardware (e.g. in an ASIC, etc.) or via any other mechanism. Still yet, while the logic 314 is shown to reside within an enclosure shared by the storage devices 302, 304, other embodiments are contemplated where the logic 314 may reside remotely (e.g. in a host, etc.).

In particular, such logic 314 may tally the incoming error events in the one or more counters 312 using the sliding window. For example, any new error events may be counted and remain in the tally stored by the counters 312 until a time passes that is equal to a duration of the sliding window. If, at any point, the running count in the sliding window surpasses a threshold, a reaction may be initiated by the logic 314. For example, the expanders 306 may, under the control of the logic 314, may disable a PHY device and an associated one or more of the links 307. Further, since the sliding window more accurately counts the error events, such disablement may be triggered in a more effective manner.

Figure 4:
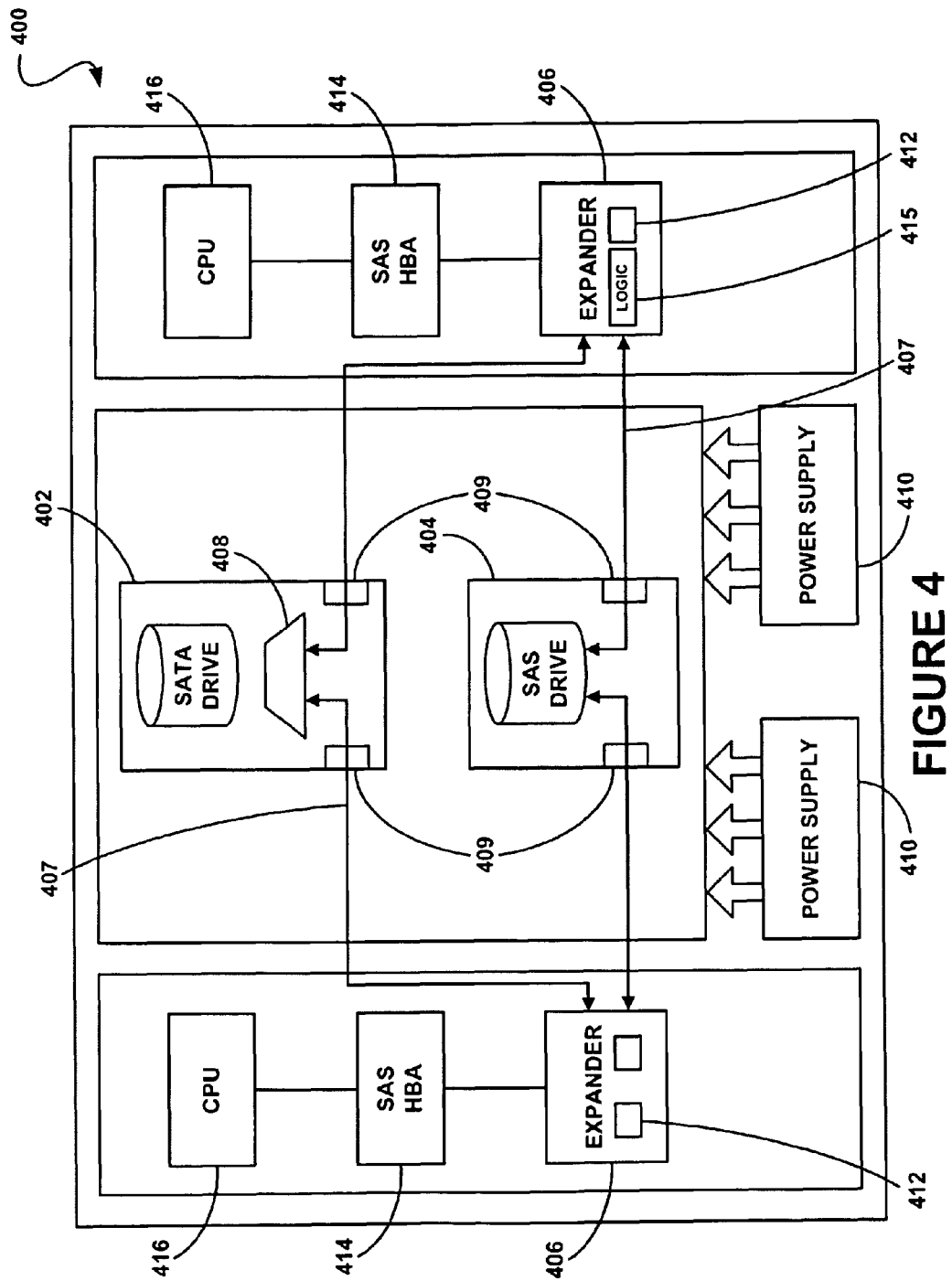
FIG. 4 illustrates a RAID storage sub-system, in accordance with yet another embodiment.

FIG. 4 illustrates a RAID storage sub-system 400, in accordance with yet another embodiment. As an option, the RAID storage sub-system 400 may implement the functionality of FIG. 2. Of course, however, it should be noted that the RAID storage sub-system 400 may be implemented in any desired environment. Again, the definitions provided above equally apply to the present description.

Similar to the embodiment of FIG. 3, the RAID storage sub-system 400 of the present figure may include a plurality of storage devices. As shown, one or more SATA storage devices 402, and/or one or more SAS storage devices 404 may be provided. Such storage devices 402, 404 may, in turn, communicate with a pair of expanders 406 via a plurality of links 407. As shown, the storage devices 402, 404 may be equipped with PHY devices 409 for facilitating such communication. Further, the SATA storage devices 402 may communicate with the expanders 406 via a multiplexer 408.

Unlike the embodiment of FIG. 3, the RAID storage sub-system 400 of the present figure may not necessarily be coupled to other sub-systems. Further, the expanders 406 may be coupled to a dedicated SAS host bus adapter (NBA) 414 which, in turn, is coupled to a central processing unit (CPU) 416. For power purposes, a plurality of power supplies 410 may be coupled to the storage devices 402, 404, the NBA 414, and the CPU 416. Additional details regarding one possible storage system in which the present RAID storage sub-system 400 may be implemented will be set forth during the description of different embodiments illustrated in subsequent figures.

Similar to the embodiment of FIG. 3, the expanders may be equipped with counters 412 and accompanying logic 415 for tallying the incoming error events in the one or more counters 412 using the sliding window. For example, any new error events may be counted and remain in the tally stored by the counters 412 until a time passes that is equal to a duration of the sliding window. If, at any point, the running count in the sliding window surpasses a threshold, a reaction may be initiated by the logic 415. For example, the expanders 406 may, under the control of the logic 415, may disable a PHY device and an associated one or more of the links 407. Further, since the sliding window more accurately counts the error events, such disablement may be triggered in a more effective manner. More information regarding one possible example of such sliding window operation will now be set forth.

Figure 5:
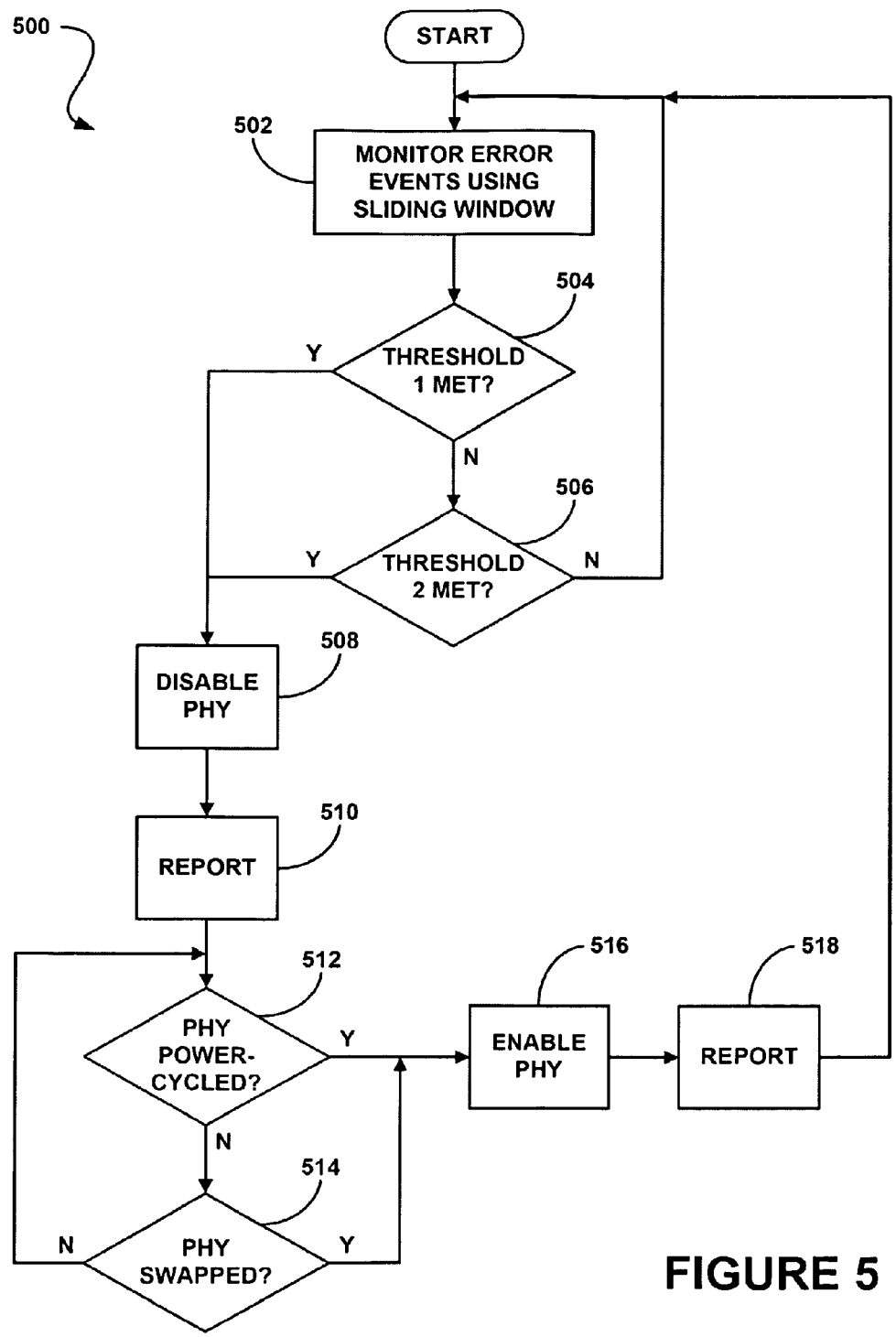
FIG. 5 illustrates a method for counting storage-related error events using a sliding window, in accordance with another embodiment.

FIG. 5 illustrates a method 500 for counting storage-related error events using a sliding window, in accordance with one embodiment. In one embodiment, error events may be received by an expander (e.g. the expanders 306, 406 of FIGS. 3-4) from a PHY device of a storage device (e.g. the storage devices 302, 304, 402, 404, etc.).

As an option, the method 500 may be used in the context of the framework and/or functionality of FIGS. 2-4. For example, in one embodiment, the method 500 may be carried out by expander logic. See the logic 314, 415 of FIGS. 3-4, for example. Of course, however, it should be noted that the method 500 may be implemented in any desired environment. Yet again, the definitions provided above equally apply to the present description.

As shown, error events received via a PHY device are monitored and tallied utilizing at least one counter (e.g. the counters 212, 312). See operation 502. Such error events tallied in the counter are then counted by the logic (e.g. logic 314, 415 of FIGS. 3-4, etc.) to determine whether they exceed any one or more different thresholds. See decisions 504 and 506. In one embodiment, such counting may be performed using the exemplary technique set forth during the description of FIG. 2 (see Tables 1-2). Of course, while two thresholds are shown in FIG. 5, such number is set forth for illustrative purposes only, as any number (greater/lesser) of thresholds may be employed, as desired. In any case, it may be determined whether at least one of the thresholds has been counted in the sliding the window, for reacting to the error events if such one or more thresholds are met.

As mentioned earlier, such different thresholds may take on various forms. Just by way of example, the threshold number of error events may be defined as a number of error events that disrupt and/or even preclude input/output operation of the at least one storage device. In additional embodiments, the thresholds may vary, based on a rate of speed at which the storage device and associates links are operating. For example, a first threshold may be used for monitoring the error events when the storage device and associated links are communicating at a first data rate (e.g. a normal operation rate). Similarly, a second threshold may be used for monitoring the error events at a second data rate (e.g. link rate) that is faster than the first rate.

In even still additional embodiments, the thresholds may vary for each of a plurality of PHY devices. While not shown, the thresholds may, in such embodiment, include a first threshold for monitoring the error events associated with a first PHY device and a second threshold for monitoring the error events associated with a second PHY device, and so on. For example, in one embodiment, some PHY devices may be categorized as host PHY devices, which connect a storage device to a host system or to another storage device. Further, some PHY devices may be categorized as drive PHY devices including those that connect an expander and a storage drive of a storage device. Of course, other classifications are possible. In any case, the thresholds may vary based on a type of the PHY device. For instance, in the above example, a first threshold associated with a host PHY device may be set lower (and thus be stricter) than a drive PHY device.

In any case, the thresholds and duration of the sliding window may be user-configurable for setting a desired error rate at which to react to a misbehaving device. To this end, a reaction may be initiated in response to at least one of the thresholds being triggered, as appropriate. For example, the PHY device may be disabled in response to at least one of the thresholds being met, as indicated in operation 508. As mentioned earlier, such disablement may take the form of disabling, disconnecting or otherwise taking the PHY device and/or the associated storage device/link out of service.

Even still, the reaction may also include a report of the triggering event. See operation 510. In the present description, such report may include any indication that at least one of the thresholds has been met. In one embodiment, such report may include the population of a template and use of the populated template to report the same via a graphical user interface (GUI) or the like. In various embodiments, the report of operation 510 may include other information such as the current error count, an identification of the threshold that was triggered, a summary or status of the reaction, etc.

For example, the report may take the form of a template-based report, and any standardized template may be extended to include the information set forth above. Of course, the report may take on any format including, but not limited to an ASCII format, binary format, etc. While the reactions (e.g. operations 508 and 510) are shown to both occur irrespective as to which threshold is triggered, it should be noted that such reactions may also be different for the triggering of different thresholds.

Subsequently, the PHY device may remain disabled until an event has occurred which has at least the potential of rectifying a source of the error events. For example, the expander logic may be configured to detect whether the PHY device has been deactivated and subsequently activated (e.g. "power-cycled"), as indicated in decision 512. In another embodiment, the expander logic may be configured to detect whether the PHY device is replaced by being swapped with another PHY device, etc. See decision 514.

Upon the decisions 512 and/or 514 being triggered, the PHY device may be enabled again for use. See operation 516. This enablement may, for example, take the form of reconnecting (e.g. mechanically, electrically, etc.) or otherwise allowing the PHY device and/or the associated storage device/link to again be available for service. Further, the enablement may be reported in operation 518. Such reporting may be provided in a manner that is similar to the reporting of operation 510.

Figure 6:
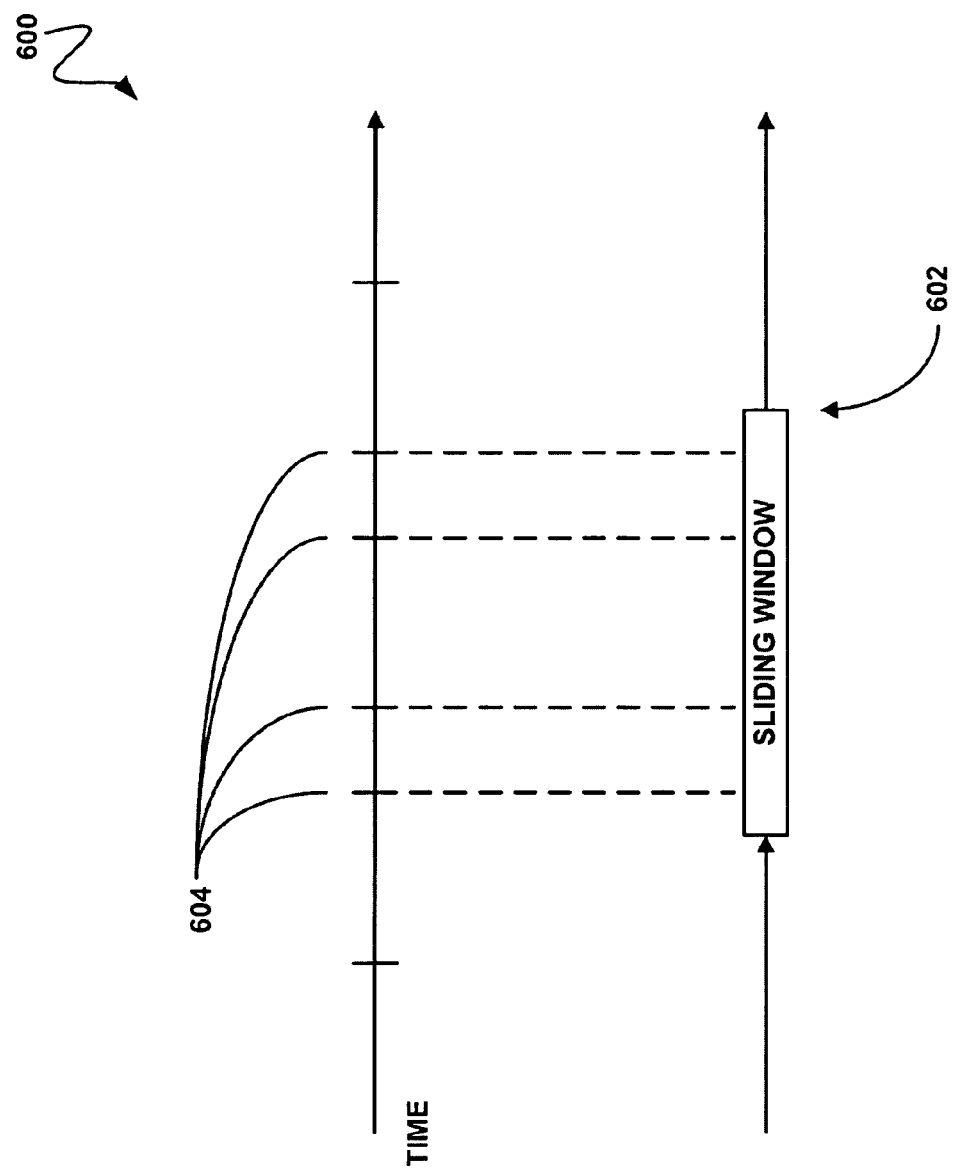
FIG. 6 illustrates an exemplary error counting technique using a sliding sampling window, in accordance with one embodiment.

FIG. 6 illustrates an exemplary error counting technique 600 using a sliding sampling window 102, in accordance with one embodiment. As an option, the technique 600 may be implemented in the context of the framework and/or functionality of FIGS. 2-5. Of course, however, it should be noted that the technique 600 may be implemented in any desired environment. Again, the definitions provided above equally apply to the present description.

Figure 1:
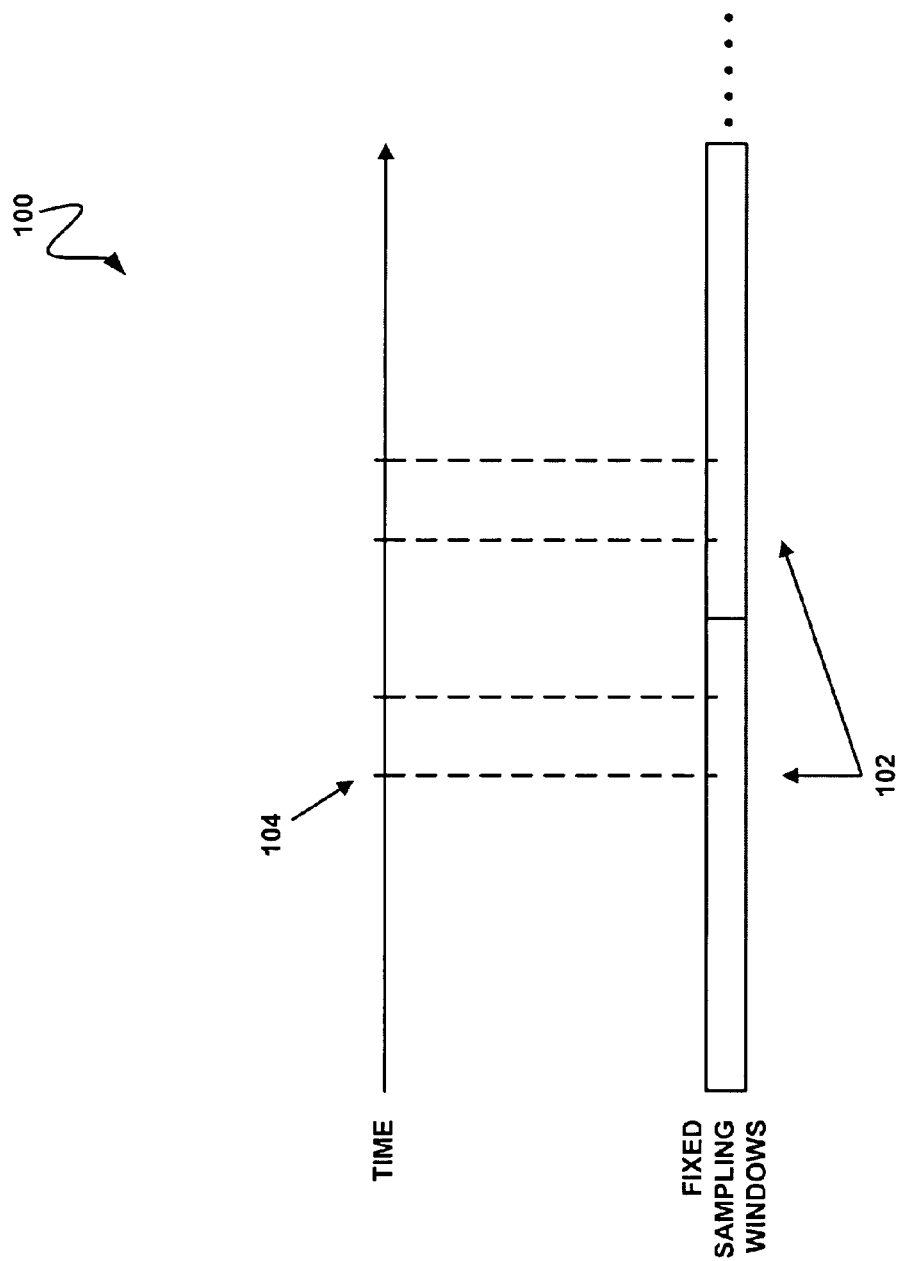
FIG. 1 illustrates an exemplary error counting technique using fixed sampling windows, in accordance with the prior art.

As shown, a plurality of error events 604 is counted using sliding sampling windows 602. As shown, in the case where an error threshold number of 4 events is defined for the sampling window 602, the current technique 600 would count all 4 of the error events 604 shown in the sampling windows 602. This is in contrast to the fixed sampling window of FIG. 1 which would only count 2 error events in a first fixed sampling window, and only count 2 error events in a second fixed sampling windows, etc. By this design, the threshold in the present technique 600 will indeed trigger a reaction in a situation where a threshold number of events has occurred in close proximity.

Using the foregoing technique, disruptive storage devices may be more effectively taken out of service by more accurately counting error events that warrant such disablement. Still yet, this may be accomplished with less or even without intervention from host software or a system administrator, in some embodiments. By virtue of such reduced interaction, customer perception may also be improved, as a result of the perceived proactive maintenance and protection of user data. Still yet, the present techniques may be used to reduce or eliminate the need for expensive and complex out-of-band management infrastructure which would otherwise be required to more accurately track error events.

Figure 7:
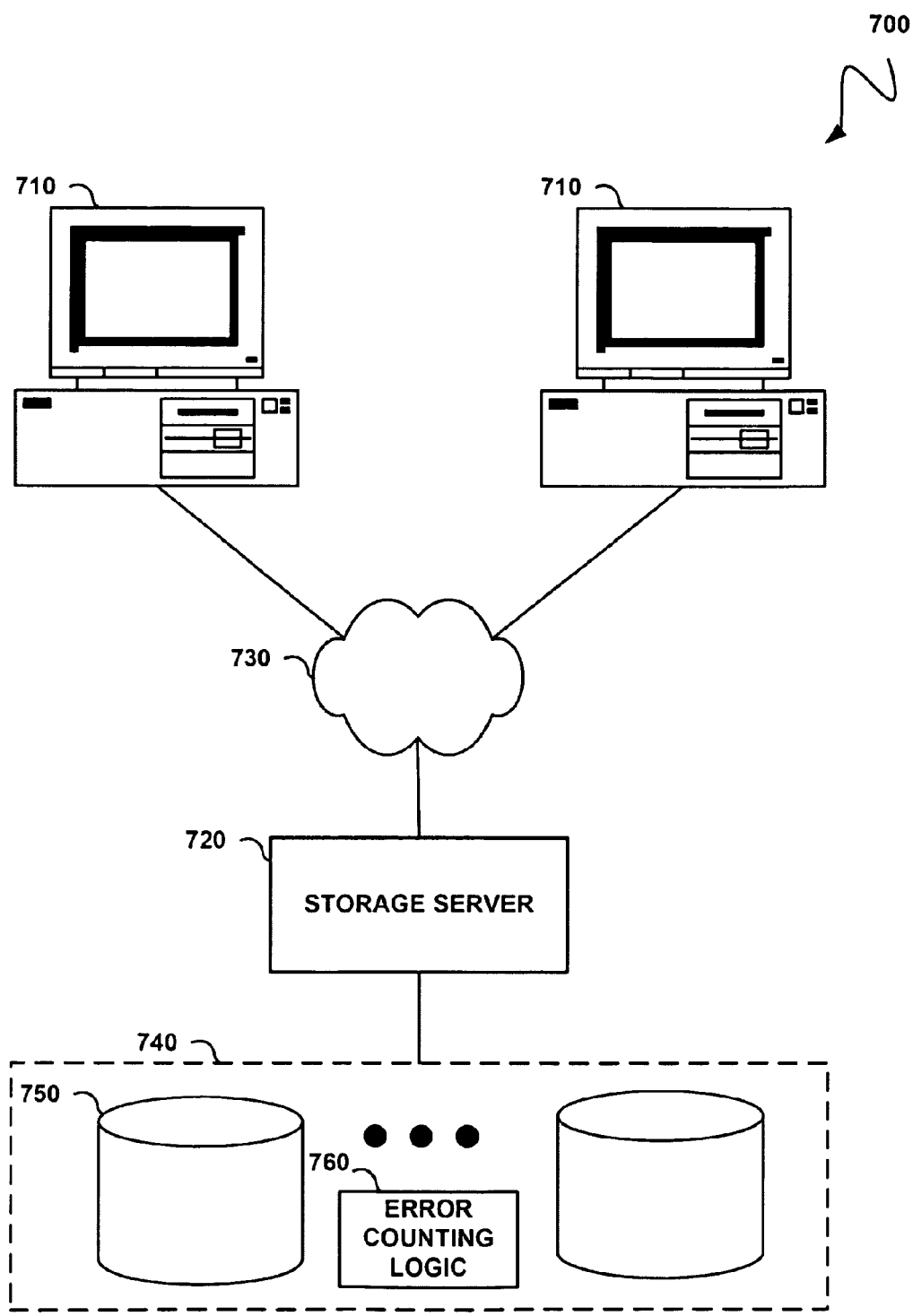
FIG. 7 is an illustration of a network environment in which an embodiment may be implemented.

FIG. 7 is an illustration of a network environment 700 in which an embodiment may be implemented. As an option, the network environment 700 may represent one possible framework with which the method 200 of FIG. 2 may be implemented. Further, error counting logic 760 may be incorporated in a storage subsystem 740, as shown, for carrying out the error counting. Of course, however, it should be noted that the network environment 700 may be used in any desired environment and incorporate any one or more of the features described in the previous figures.

Of course, the various embodiments described herein are not limited to any particular environment, and may be implemented in various storage processes. In the present illustration, the storage system includes a storage server 720. The storage server 720 is coupled with the storage subsystem 740, which includes a set of mass storage devices 750, and to a set of clients 710 through a network 730, such as a local area network (LAN) or other type of network. Each of the clients 710 may be, for example, a conventional personal computer (PC), workstation, or any of the other example clients set forth earlier.

The storage subsystem 740 is managed by the storage server 720. For example, the storage server 720 may receive and respond to various read and write requests from the clients 710, directed to data stored in or to be stored in the storage subsystem 740. The mass storage devices 750 in the storage subsystem 740 may be, for example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

In one embodiment, the storage subsystem 740 may include one or more shelves of storage devices. For example, such shelves may each take the form of one of the subsystems shown in FIGS. 3-4. As shown, the storage subsystem 740 may further include the error counting logic 760 for more accurately categorizing potential error events as actual error events, without mistakenly including non-error events in such count. In one embodiment, the error counting logic 760 may reside in an expander (not illustrated) of the storage subsystem 740, in the manner set forth in FIGS. 3-4. While, in the present embodiment, such error counting logic 760 is shown to be a component of the storage subsystem 740 it should be noted that the it may reside elsewhere as well (e.g. exterior of the storage subsystem 740, at the storage server 720, etc.).

The storage server 720 may have a distributed architecture; for example, it may include separate N-module (network module) and D-module (data module) components (not shown). In such an embodiment, the N-module is used to communicate with the clients 710, while the D-module includes the file system functionality and is used to communicate with the storage subsystem 740. In another embodiment, the storage server 720 may have an integrated architecture, where the network and data components are all contained in a single box or unit. The storage server 720 further may be coupled through a switching fabric to other similar storage systems (not shown) that have their own local storage subsystems. In this way, all of the storage subsystems can form a single storage pool, to which any client of any of the storage systems has access.

Figure 8:
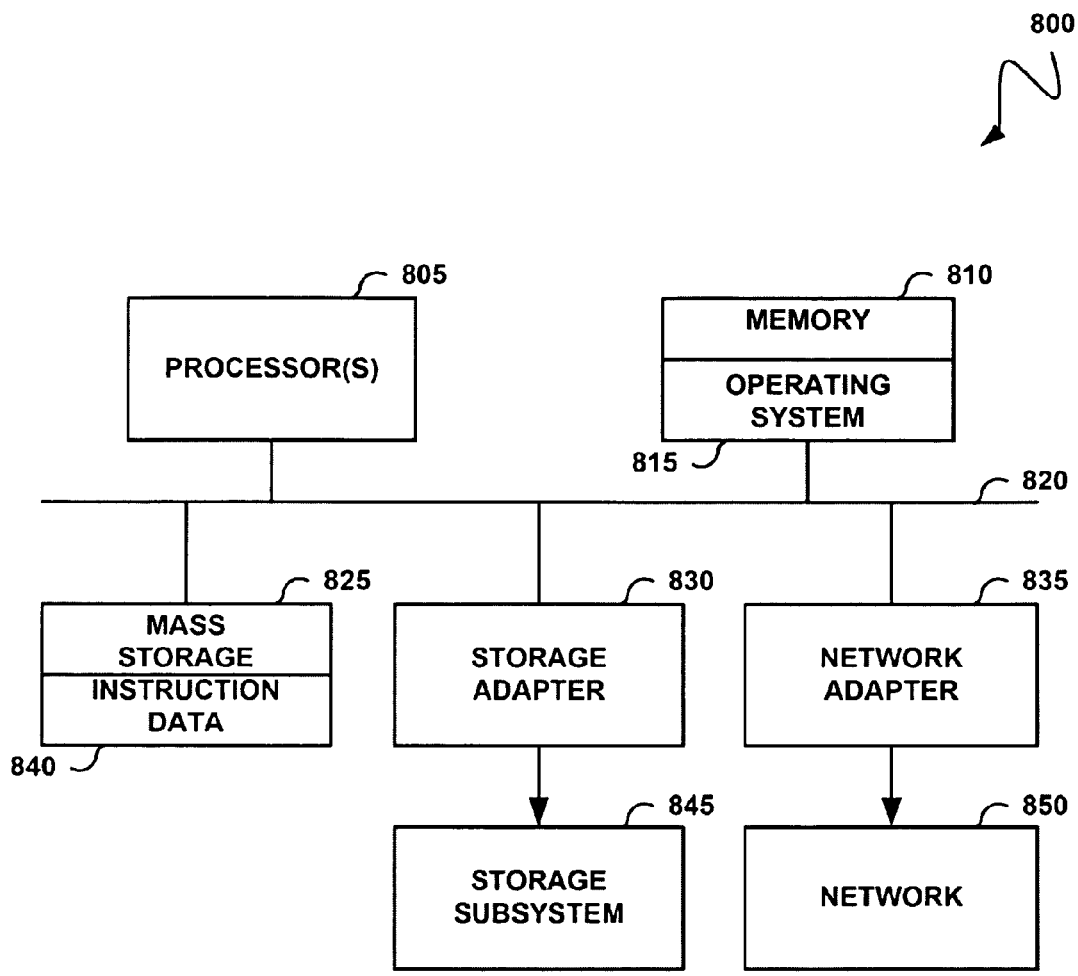
FIG. 8 is a block diagram illustrating an architecture of a storage server that may include an embodiment.

FIG. 8 is a block diagram illustrating an architecture of a storage server 800 that may include an embodiment. In one embodiment, the storage server 800 may represent the storage server 720 of FIG. 7. Of course, however, it should be noted that the storage server 800 may be implemented in any desired environment and incorporate any one or more of the features described in the previous figures.

The storage server 800 includes one or more processors 805 and memory 810 coupled to a interconnect 820. The interconnect 820 shown in FIG. 8 is an abstraction that represents any one or more separate physical buses, point-to-point connections, or both connected by appropriate bridges, adapters, or controllers. The interconnect 820, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 805 may include central processing units (CPUs) of the storage server 800 and, thus, control the overall operation of the storage server 800. In certain embodiments, the processor(s) 805 accomplish this by executing software stored in memory 810. The processor(s) 805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 810 is or includes the main memory of the storage server 800. The memory 810 represents any form of random access memory (RAM), read-only memory (ROM), flash memory, or the like, or a combination of such devices. In use, the memory 810 stores, among other things, the operating system 815 of the storage server 800.

Also connected to the processor(s) 805 through the interconnect 820 may be one or more internal mass storage devices 825, a storage adapter 830 and a network adapter 835. The internal mass storage devices 825 may be or include any medium for storing large volumes of instructions and data 840 in a non-volatile manner, such as one or more magnetic or optical-based disks. The storage adapter 830 allows the storage server 800 to access a storage subsystem 845 and may be, for example, a Fibre Channel adapter or a SCSI adapter. The storage adapter 830 may interface with a D-module portion of the storage server. The network adapter 835 provides the storage server 800 with the ability to communicate with remote devices, such as clients, over a network 850 and may be, for example, an Ethernet adapter. The network adapter 835 may interface with an N-module portion of the storage server 800.

Figure 9:
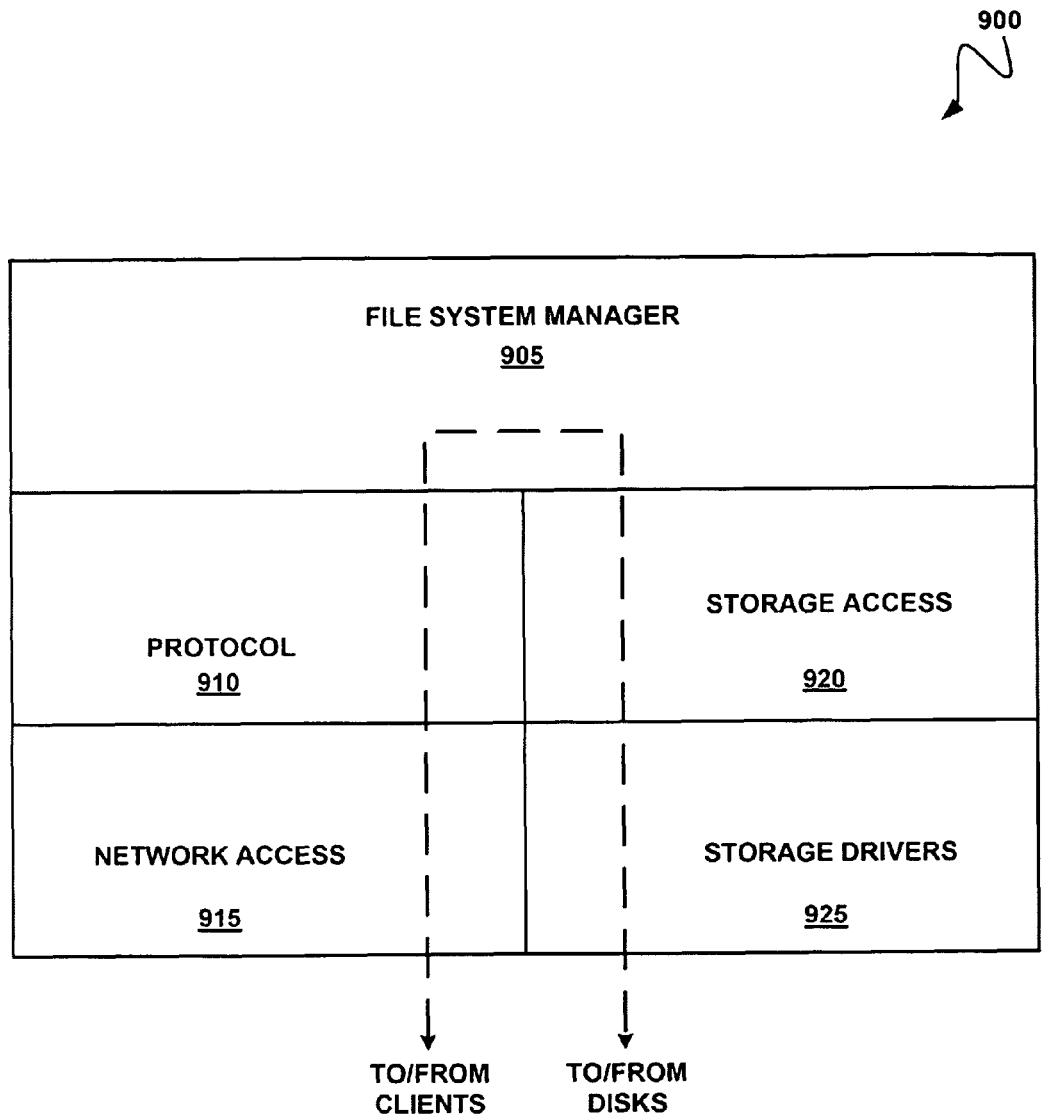
FIG. 9 illustrates an example of an operating system of a storage server according to one possible embodiment.

FIG. 9 illustrates an example of the operating system 900 of a storage server according to one possible embodiment. As an option, the operating system 900 may be installed on the storage server 800 of FIG. 8. Of course, however, it should be noted that the operating system 900 may be used in any desired environment and incorporate any one or more of the features described in the previous figures.

As shown, the operating system 900 includes several modules, or "layers." These layers include a file system manager 905. The file system manager 905 is software that keeps track of the directory structure (hierarchy) of the data stored in a storage subsystem and manages read/write operations on the data (i.e. executes read/write operations on the disks in response to client requests).

The operating system 900 also includes a protocol layer 910 and an associated network access layer 915, to allow a storage server to communicate over a network to other systems, such as clients. The protocol layer 910 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 915 includes one or more drivers, which implement one or more lower-level protocols to communicate over the network, such as Ethernet. Interactions between clients and mass storage devices (e.g. disks, etc.) are illustrated schematically as a path, which illustrates the flow of data through the operating system 900.

The operating system 900 further includes a storage access layer 920 and an associated storage driver layer 925 to allow a storage server to communicate with a storage subsystem. The storage access layer 920 implements a higher-level disk storage protocol, such as RAID, while the storage driver layer 925 implements a lower-level storage device access protocol, such as Fibre Channel Protocol (FCP) or SCSI. In one embodiment, the storage access layer 920 may implement a RAID protocol, such as RAID-4 or RAID-DP™ (RAID double parity for data protection provided by NetApp, Inc.), and therefore may alternatively be referred to as RAID layer 920.

The foregoing description has set forth only a few of the many possible implementations. For this reason, this detailed description is intended by way of illustration, and not by way of limitations. Variations and modifications of the embodiments disclosed herein may be made based on the description set forth herein, without departing from the scope and spirit of the present application.

It is only the following claims, including all equivalents, that are intended to define the scope of the various embodiments. Moreover, the embodiments described above are specifically contemplated to be used alone as well as in various combinations. Accordingly, other embodiments, variations, and improvements not described herein are not necessarily excluded.

What is claimed is:

1. A method for counting error events associated with an operation of at least one storage device utilizing a sliding window, comprising:
    defining the sliding window and a threshold number of error events;
    storing the sliding window and the threshold number of error events in memory;
    monitoring the operation of the at least one storage device;
    during the monitoring, detecting the error events associated with the operation of the at least one storage device;
    counting the plurality of error events utilizing the sliding window;
    determining whether the threshold number of error events has been counted in the sliding the window; and
    reacting to the error events, if it is determined that the threshold number of error events has been counted in the sliding the window;
    wherein the threshold number varies based on a type of PHY device;
    wherein the type of PHY device includes a host PHY device which connects the at least one storage device to a host system or to another storage device, and a drive PHY device that connects an expander and a storage drive of the at least one storage device;
    wherein the threshold associated with the host PHY device is set lower than the threshold associated with the drive PHY device.

2. The method of claim 1, wherein logic performing the counting and the determining is positioned within an enclosure shared by the at least one storage device.

3. The method of claim 1, wherein logic performing the counting and the determining is positioned remotely with respect to the at least one storage device.

4. The method of claim 1, wherein the threshold number of error events is defined as a number of error events that disrupt input/output operation of the at least one storage device.

5. The method of claim 1, wherein the threshold number of error events is defined as a number of error events that preclude input/output operation of the at least one storage device.

6. The method of claim 1, wherein the threshold numbers include a third threshold number for use when counting the error events associated with a first PHY device and a fourth threshold number for use when counting the error events associated with a second PHY device.

7. The method of claim 1, wherein the reacting includes generating a report.

8. The method of claim 1, wherein the reacting includes disabling a PHY device that communicates with the at least one storage device.

9. The method of claim 8, and further comprising enabling the PHY device based on predetermined criteria.

10. The method of claim 9, wherein the predetermined criteria is met when the PRY device is replaced.

11. The method of claim 9, wherein the predetermined criteria is met when the PHY device is deactivated and subsequently activated.

12. The method of claim 1, wherein the sliding window is configurable.

13. The method of claim 12, wherein a duration of the sliding window is configurable.

14. The method of claim 1, wherein the sliding window is configured remotely using a host coupled to the at least one storage device over a network.

15. The method of claim 1, wherein the sliding window is valid for a predetermined amount of time.

16. The method of claim 1, wherein the sliding window is persistently valid between a plurality of system boots.

17. A system, comprising:
    at least one storage device; and
    an expander coupled to the at least one storage device via a link, the expander including logic for defining a sliding window and a threshold number of error events, monitoring an operation of the at least one storage device, detecting a plurality of error events associated with the operation of the at least one storage device, counting the plurality of error events utilizing the sliding window, determining whether the threshold number of error events has been counted in the sliding the window, and reacting to the error events, if it is determined that the threshold number of error events has been counted in the sliding the window;
    wherein the threshold number varies based on a type of PHY device;
    wherein the PHY device includes a host PHY device which connects at least one storage device to a host system or to another storage device, and a drive PHY device that connects an expander and a storage drive of the at least one storage device;

wherein the threshold associated with the host PHY device is set lower than the threshold associated with the drive PHY device.

18. The system of claim 17, wherein the logic is positioned within an enclosure shared by the at least one storage device.

19. The system of claim 17, wherein the logic is positioned remotely with respect to the at least one storage device.

20. The system of claim 17, wherein the threshold number of error events is defined as a number of error events that disrupt input/output operation of the at least one storage device.

21. The system of claim 17, wherein the threshold number of error events is defined as a number of error events that preclude input/output operation of the at least one storage device.

22. An apparatus, comprising:
an expander for being connected to at least one storage device, the expander including logic for defining a sliding window and a threshold number of error events, monitoring an operation of the at least one storage device, detecting a plurality of error events associated with the operation of the at least one storage device, counting the plurality of error events utilizing the sliding window, determining whether the threshold number of error events has been counted in the sliding the window, and reacting to the error events, if it is determined that the threshold number of error events has been exceeded in the sliding the window;
wherein the threshold number varies based on a type of PHY device;
wherein the type of PRY device includes a host PHY device which connects the at least one storage device to a host system or to another storage device, and a drive PHY device that connects an expander and a storage drive of the at least one storage device;
wherein the threshold associated with the host PHY device is set lower than the threshold associated with the drive PHY device.

23. The method of claim 1, wherein a type of the reaction is based on the threshold number, such that different reactions are associated with different threshold numbers.

* * * * *

UNITED STATES PATENT AND TRADEMARK OFFICE
CERTIFICATE OF CORRECTION

| | | |
|---|---|---|
| PATENT NO. | : 8,156,382 B1 | |
| APPLICATION NO. | : 12/111842 | |
| DATED | : April 10, 2012 | |
| INVENTOR(S) | : Booth et al. | |

It is certified that error appears in the above-identified patent and that said Letters Patent is hereby corrected as shown below:

In the claims:
    Claim 10, col. 12, line 32; please replace "PRY" with --PHY;--;
    Claim 17, col. 12, line 63; please insert --type of-- after "the" and before "PHY";
    Claim 17, col. 12, line 64; please insert --the-- after "connects" and before "at";
    Claim 22, col. 14, line 10; please replace "PRY" with --PHY--.

Signed and Sealed this
Fourth Day of September, 2012

David J. Kappos
*Director of the United States Patent and Trademark Office*